(12) United States Patent
Ikuno (10) Patent No.: US 8,417,042 B2
(45) Date of Patent: Apr. 9, 2013

(54) IMAGE PROCESSING APPARATUS, CONTROL METHOD AND COMPUTER-READABLE MEDIUM

(75) Inventor: Takao Ikuno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 12/869,302

(22) Filed: Aug. 26, 2010

(65) Prior Publication Data

US 2011/0064320 A1  Mar. 17, 2011

(30) Foreign Application Priority Data

Sep. 17, 2009  (JP) ................................. 2009-216170

(51) Int. Cl.
*G06K 9/36* (2006.01)

(52) U.S. Cl. ....................................................... 382/232

(58) Field of Classification Search .................. 382/232, 382/233, 240, 244–251

See application file for complete search history.

(56) References Cited

U.S. PATENT DOCUMENTS

2008/0069457 A1  3/2008  Matsumoto .................... 382/232
2008/0204768 A1  8/2008  Ikuno et al. ..................... 358/1.1

FOREIGN PATENT DOCUMENTS

JP  2008-042687  2/2008

*Primary Examiner* — Duy M Dang
(74) *Attorney, Agent, or Firm* — Fitzpatrick, Cella, Harper & Scinto (57) ABSTRACT

An image processing apparatus comprises: a resolution compression unit that performs resolution compression by thinning out pixels of a unit block image that has a second size that is larger than a first size; a registration unit that registers the block image generated by the resolution compression unit in a block management table; and an encoding compression unit that performs an encoding compression process on each block image registered by the registration unit; wherein the resolution compression unit determines a compression level for unit block images having the second size and compresses each unit block image having the second size with a compression rate according to the determined compression level, and the registration unit divides the block image compressed according to the determined compression level into block images having the first size and registers the divided block images in the block management table in units of the second size.

5 Claims, 11 Drawing Sheets

HIGH COMPRESSION :
COMPRESSED TO 1/4×1/4
MEDIUM COMPRESSION :
COMPRESSED TO 1/2×1/2
LOW COMPRESSION :
COMPRESSED TO 1×1

RESOLUTION
COMPRESSION BLOCK
128×128 PIXELS

BASIC
COMPRESSION BLOCK
32×32 PIXELS

IMAGE PROCESSING APPARATUS, CONTROL METHOD AND COMPUTER-READABLE MEDIUM

BACKGROUND OF THE INVENTION

1. Field of the Invention

The present invention relates to an image processing apparatus that takes digital image data from outside the apparatus and processes and outputs the data, a control method, and a computer-readable medium storing a program.

2. Description of the Related Art

Image processing apparatuses that have become widely used in recent years, typical examples of which include copy machines and multifunction peripherals, have a high-resolution reading unit and a high-resolution recording unit in order to generate high quality images, and are capable of processing high resolution images. Accordingly, the amount of image data which must be processed by an image processing apparatus is becoming very large. Image processing apparatuses must store large amounts of image data, but it is difficult for them to do so because the amount of built-in memory they have is limited. In addition, even when an image processing apparatus attempts to perform high-speed processing, because the volume of data is large, a burden is imposed on the data bus of a circuit provided in the apparatus, which slows data transfer. Therefore, it is difficult to perform high-speed processing. In view of this, Japanese Patent Laid-Open No. 2008-42687 proposes a method for reducing the amount of data without lowering the image quality in cases of such a large amount of image data. According to the method disclosed in Japanese Patent Laid-Open No. 2008-42687, image data is divided into blocks, and classified into two groups based on the content of image data of each block, namely, a group of blocks that cause no problem even when the image quality is lowered and a group of blocks whose image quality must be maintained at high level. Then, the blocks that cause no problem even when the image quality is lowered are data-compressed using a compression factor or a compression scheme that provides a high compression rate but reduces image quality. In contrast, the blocks whose image quality needs to be maintained at high level are data-compressed using a compression factor or a compression scheme that provides a low compression rate but provides high image quality. That is, it has been proposed to reduce the size of image data while minimizing the lowering of image quality by changing the processing method for each type of block.

The above-described scheme in which image data is divided into blocks, the blocks are classified into high image quality blocks and low image quality blocks, and the compression method and compression rate factor are changed according to the type of blocks is very effective in data reduction. However, this scheme has the following problems. In the case where image processing that requires information regarding surrounding pixels of a pixel of interest, such as a dithering process or a filter process, is performed on a block, encoding compression data is used, and it is therefore necessary to perform a decompression process. For this reason, when image processing as described above is performed, it is necessary to perform the decompression process a number of times during the time between the input of image data and the storage of the data in a memory, and after image processing, a compression process needs to be performed again. Consequently, because compression and decompression are repeated, a long processing time is required, and thus it is not suitable for generating a high-speed data path. Conversely, it is also possible to conceive a scheme in which image data is not compressed during the time between the input of the image data to the storage of the image data in a memory, and data processing is performed on the raw image data. However, in this scheme, when an input image is data having a high quality and a high resolution, the data is streamed through a data bus between image processing modules, so a very heavy burden is imposed on the data bus. Accordingly, it is difficult even for this scheme to cope with a high-speed data path. This problem can be solved by, in the case of performing a compression process on each block, performing only a resolution reduction process without performing an encoding process. For example, a scheme can be used in which blocks are classified into two groups, namely, a group of blocks whose image quality can be lowered and a group of blocks whose image quality needs to be maintained at high level, and the blocks whose image quality can be lowered are subjected to a thinning out process in which image data is thinned out to half in the vertical and horizontal directions. Because only resolution is reduced, images that have undergone resolution reduction are raw image data, and it is therefore possible to perform image processing as described above such as a dithering process or a filter process.

However, this technique has a problem as well. The problem is that it is not possible to compress image data in which blocks having different resolutions are mixed by using a typical encoding scheme. The ordinary encoding scheme works when all the pixels of an image have the same weight. It is therefore not possible to simply perform image encoding when blocks/pixels having different resolutions are mixed in one image data piece as described above.

SUMMARY OF THE INVENTION

According to one aspect of the present invention, there is provided an image processing apparatus comprising: a resolution compression unit that performs resolution compression by thinning out pixels of a unit block image that has a second size that is larger than a first size; a registration unit that registers the block image generated by the resolution compression unit in a block management table; and an encoding compression unit that performs an encoding compression process on each block image registered by the registration unit; wherein the resolution compression unit determines a compression level for unit block images having the second size and compresses each unit block image having the second size with a compression rate according to the determined compression level, and the registration unit divides the block image compressed according to the determined compression level into block images having the first size and registers the divided block images in the block management table in units of the second size.

According to another aspect of the present invention, there is provided a method for controlling an image processing apparatus comprising the steps of: performing resolution compression by thinning out pixels of a unit block image that has a second size that is larger than a first size; registering the block image generated in the resolution compression step in a block management table, which is performed by a registration unit of the image processing apparatus; and performing an encoding compression process on each block image registered in the registration step, which is performed by an encoding compression unit of the image processing apparatus; wherein the resolution compression step comprises determining a compression level for unit block images having the second size and compressing each unit block image having the second size with a compression rate according to the determined compression level, and the registration step comprises dividing the block image compressed according to the determined compression level into block images having the first size and registering the divided block images in the block management table in units of the second size.

According to the present invention, it is possible to encode and compress raw image data of mixed resolution. With the present invention, the amount of data can be reduced and held by partially reducing the resolution without lowering the image quality of high resolution images. It is also possible to perform processing such as a dithering process on the resolution-compressed data, and therefore a reduction in the load on the image data path can be achieved. In addition, the resolution-compressed data can be subjected to encoding compression, as a result of which the amount of data can be further reduced and held, and the load on the memory can be reduced.

Further features of the present invention will become apparent from the following description of exemplary embodiments with reference to the attached drawings.

DESCRIPTION OF THE EMBODIMENTS

Figure 1:
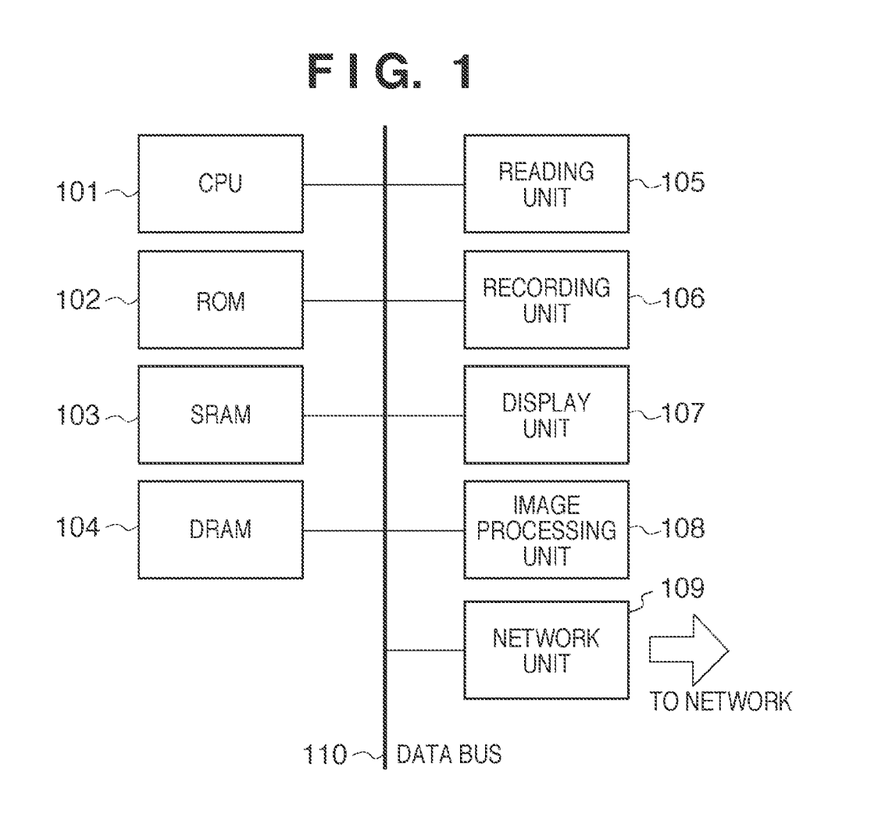
FIG. 1 is a diagram showing an example of a hardware configuration of an image processing apparatus according to an embodiment of the present invention.

Hereinafter, a best mode for carrying out the invention will be described with reference to the drawings. An example will be described in which a multifunction peripheral is used as an image processing apparatus. An example of the multifunction peripheral is shown in FIG. 1. A CPU 101 is a system control unit that controls the entire apparatus. A ROM 102 stores a control program for the CPU. An SRAM 103 stores setting values registered by operators, management data of the apparatus, various work buffers, and the like. A DRAM 104 stores program control variables and the like. A reading unit 105 is a device that reads image data and converts the data to binary data, with which original documents for transmission are read. A recording unit 106 is a device that outputs image data onto recording paper. A display unit 107 is an interface unit with the user that displays internal information of the apparatus. An image processing unit 108 (CODEC) encodes and decodes image data handled by a communication controller. A network unit 109 interfaces to a network line. The multifunction peripheral configured as described above having a function of transmitting image data read by the reading unit 105 to a network and a function of temporarily storing image data received via the network unit 109 in the SRAM 103 and printing the data by using the recording unit 106 is used as an example of the image processing apparatus according to the present embodiment. The processing described by the flowcharts given below is executed by the CPU 101 reading a control program stored in the ROM 102 or the like into a RAM.

In the multifunction peripheral as described above, the control units are connected via a data bus 110, and image data is transferred through the data bus 110. In this multifunction peripheral, image data is input through the reading unit 105 or the network unit 109, and the image data is stored in the SRAM 103. After that, the image data is processed by the image processing unit 108 and the like, and then output to the recording unit 106 or the display unit 107. Thus, when inputting and outputting images to and from the multifunction peripheral, it is necessary to transfer image data a number of times. Accordingly, in the case of handling a high resolution image, a very heavy burden is imposed on the data bus. In order to perform high-speed processing, it is necessary to reduce the burden on the data bus. In the present embodiment, a technique therefor will be described.

Figure 2:
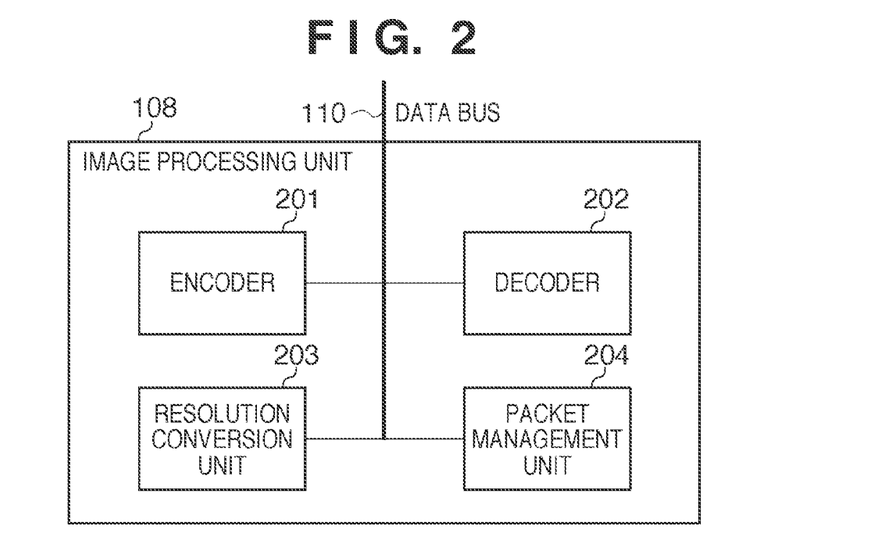
FIG. 2 is a diagram showing an example of a configuration of an internal module of an image processing unit according to the embodiment of the present invention.

FIG. 2 shows the image processing unit 108 for effectively compressing the amount of image data according to the present embodiment in more detail. An encoder 201 and a decoder 202 are processing units that are capable of performing encoding compression and decompression on raster images, respectively. A resolution conversion unit 203 is a processing unit that performs an image demagnification process on each unit block, which will be described later. A packet management unit 204 is a processing unit that generates a table for managing an image divided into blocks by the resolution conversion unit 203 over an entire page. A technique for performing efficient image data compression using the image processing unit 108 configured as above will be described.

Image Data Compression

Figure 3:
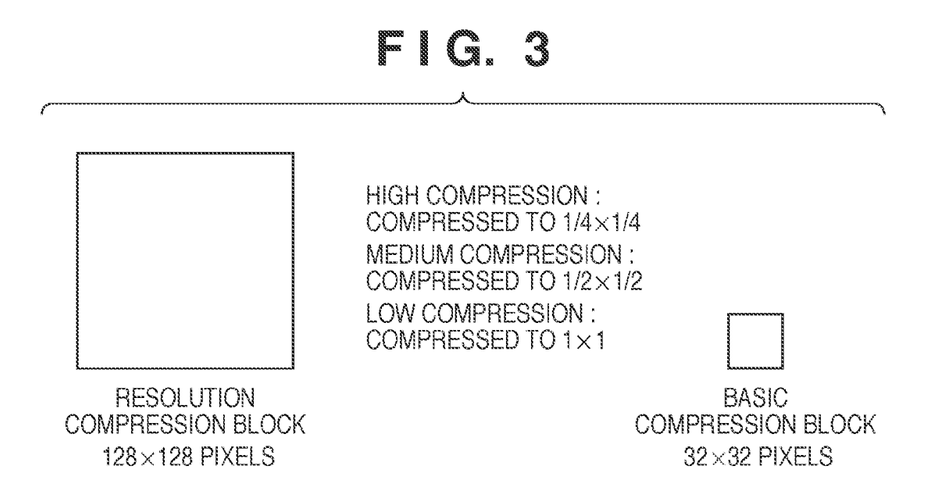
FIG. 3 is a diagram illustrating a compression unit block according to the embodiment of the present invention.

FIG. 3 shows a unit according to which compression processing is performed according to the present embodiment. In the image compression according to the present embodiment, an image is divided into unit blocks and processed. In the scheme according to the present embodiment, a unit that is subjected to resolution compression is determined first. In this example, a unit block that is subjected to resolution compression has 128×128 pixels, and hereinafter this unit block will be referred to as a "resolution compression block".

Next, image data is processed for each resolution compression unit block. Data that is determined, based on the content of the image, to be saved at a high image quality level is held without being subjected to resolution compression, but blocks that cause no problem even when the image quality is lowered are subjected to resolution compression, or in other words, an image demagnification process in which the pixels of an image are thinned out. Accordingly, the degree to which resolution compression is performed is determined based on the content of the image of a resolution compression block. In this example, the compression rate used for resolution compression is defined as follows. Resolution compression blocks that need high image quality are not compressed. Resolution compression blocks that need approximately medium image quality are subjected to resolution compression to a size of ½×½, and resolution compression blocks that cause no problem even when the image quality is low are subjected to resolution compression to a size of ¼×¼.

As the last definition, a block obtained as a result of demagnification of a resolution compression block to a minimum when the resolution compression block is compressed at a low compression level is referred to as a "basic compression block". In this example, because resolution compression blocks of low image quality are compressed to ¼×¼ the size of a resolution compression block at the minimum size, a resolution compression block having 128×128 pixels is demagnified to a block having 32×32 pixels. Accordingly, this image block having 32×32 pixels is a basic compression block. In the case of an example of compression shown in FIG. 3, a resolution compression block of high image quality is treated as an image including sixteen basic compression blocks. A block of medium image quality is compressed to four basic compression blocks, and a block of low image quality is compressed to one basic compression block. A compression process is performed on such an assumption. More specifically, in the present embodiment, as unit blocks, a unit block of a first size (basic compression block) is 32×32 pixels, and a unit block of a second size (resolution compression block) is 128×128 pixels. The first size is less than or equal to the second size. It should be noted that the compression rates and the compression block sizes mentioned above are merely an example, and the present invention is not limited thereto.

Compression Process

Figure 4:
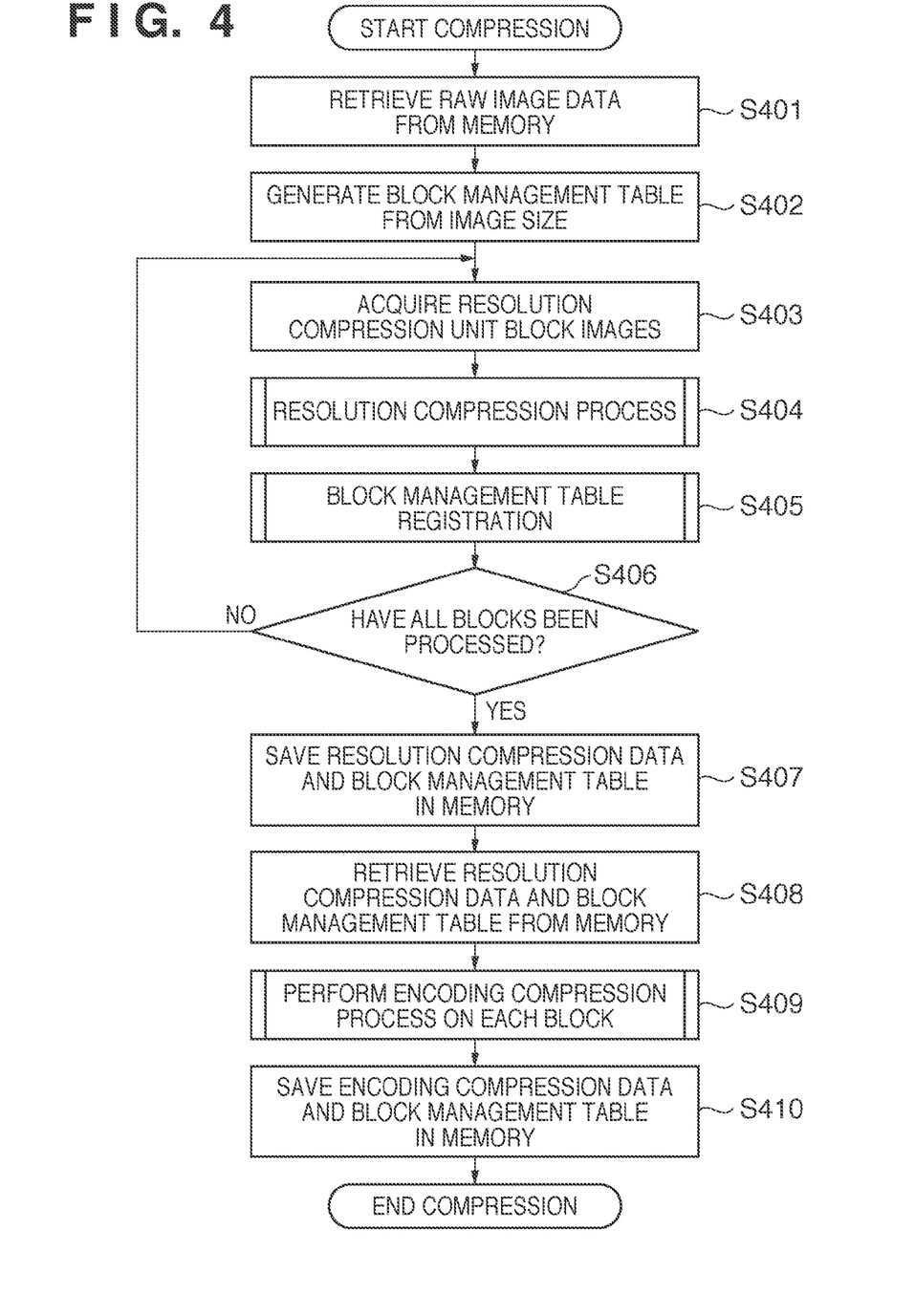
FIG. 4 shows a basic flowchart of a compression process according to the embodiment of the present invention.
Figure 5:
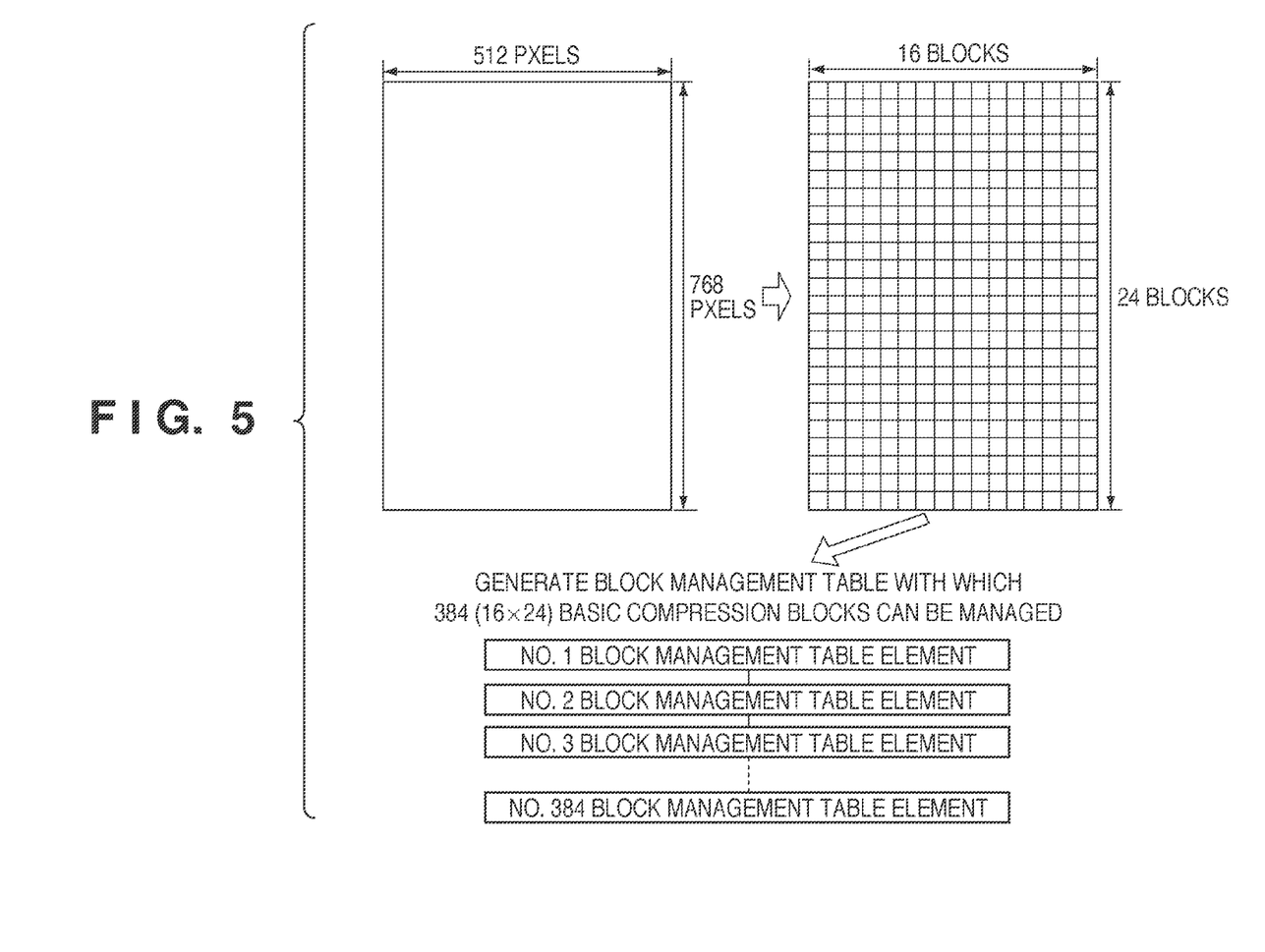
FIG. 5 is a diagram showing an example of generation of a block management table during execution according to the embodiment of the present invention.

First, an example of generation of a block management table is shown in FIG. 5. This is an example of a table generated in S402 of FIG. 4 in which a table is generated, which will be described later. Calculation is performed to obtain the number of blocks when retrieved image data is divided into blocks based on the basic compression block size, and a table that includes that number of elements is generated. An example of FIG. 5 shows a case where a 512×768 pixel image is input, and the image is divided into 16 blocks×24 blocks because the basic compression block is a block of 32×32 pixels. As a result, an element list for managing 384 blocks is generated.

FIG. 4 is a flowchart illustrating a compression processing method according to the present embodiment. A flow of the compression processing will be described with reference to the flowchart. Image data input through the reading unit 105 or the network unit 109 is temporarily stored in the SRAM 103. In S401, the image data stored in the memory is retrieved in response to an instruction from the CPU 101. In S402, a block management table is generated before the image data is processed. Next, in S403, the acquired input image data is cut into resolution compression unit blocks. The reason for this cutting step is that a resolution compression process that follows is performed in units of resolution compression unit blocks. Then, in S404, the resolution compression process is performed on the images of the resolution compression blocks. The resolution compression process will be described later with reference to FIG. 6.

Next, in S405, the image data that has undergone resolution compression is registered in a block management table. The block management table registration process will be described later with reference to FIG. 7. Next, in S406, whether all the blocks have undergone the process from S403 to S405 is determined. If all the blocks have undergone the process, the procedure advances to S407. If not, the procedure returns to S403. In S407, the resolution compression data and the block management table are saved in a memory. Next, the resolution compression image created thus far is recompressed by an encoding method such as JPEG or JPEGLS. In S408, the resolution compression data created thus far and the block management table are retrieved from the memory. Then, in S409, an encoding compression process is applied to each block. The encoding compression process applied to each block will be described later with reference to FIG. 10. Then, in S410, encoding compression data created in S409 and the block management table are saved in the memory, and the flowchart ends.

Resolution Compression Process

Figure 6:
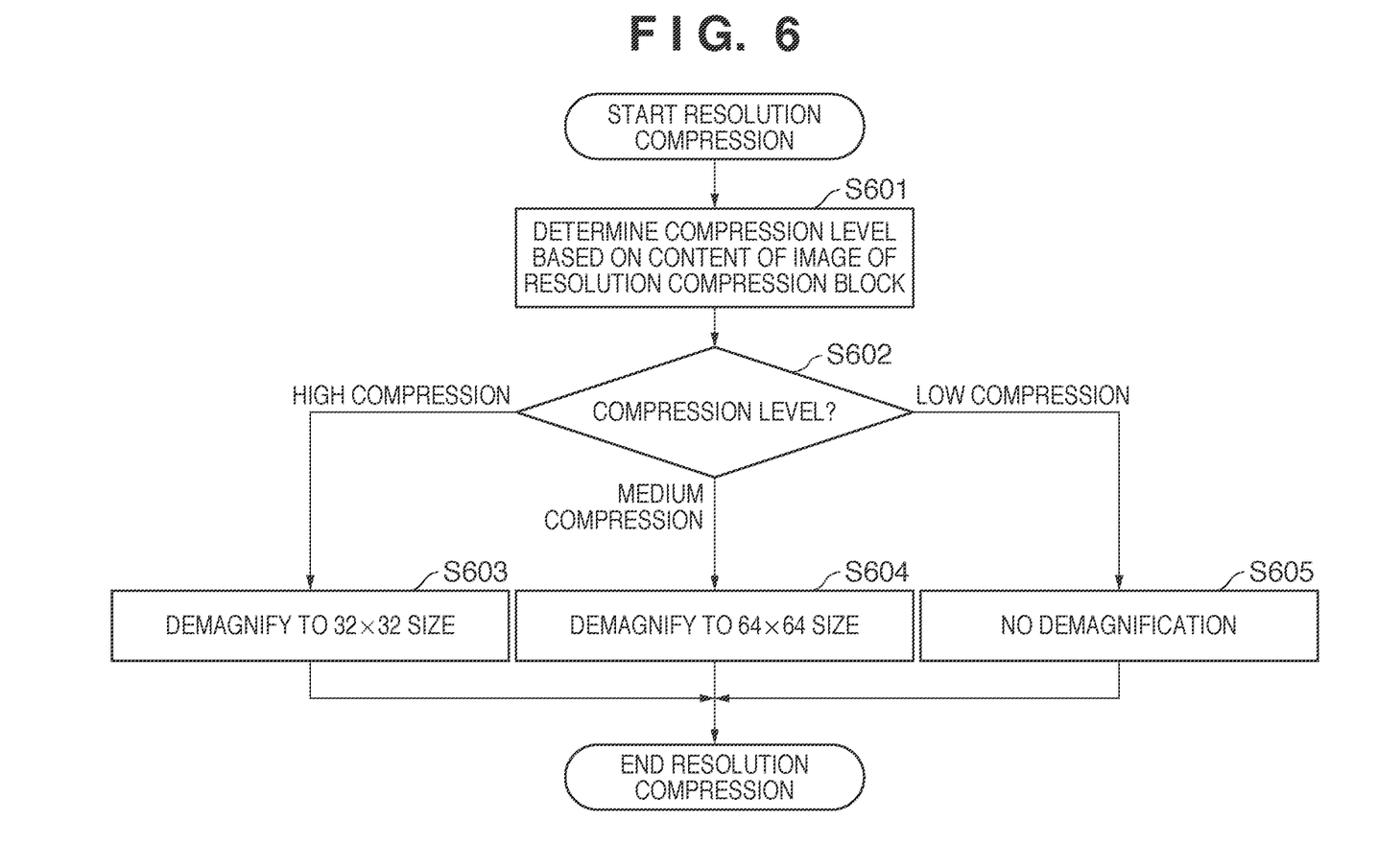
FIG. 6 shows a flowchart showing an operation of a resolution compression process according to the embodiment of the present invention.

FIG. 6 is a flowchart illustrating the resolution compression process in detail. In the resolution compression process, first, in S601, a compression level is determined based on the content of an input resolution compression block (128×128 pixels). This may be determined from the number of colors and the amount of change based on the raw data of the resolution compression block, or may be determined by using factors other than image factors such as attribute data for each pixel. Generally, in the case where the resolution compression block is made up of the same color (one color), the image quality may be low, but in the case where the resolution compression block is made up of multiple colors, the image quality is high. For example, in the case where attributes representing characters and graphics have been added to a majority of pixels of the block as attribute data of the pixels corresponding to the resolution compression block, high image quality can be in order to achieve a good reproduction of edges in characters. However, in the case where attributes representing pictures and natural color images have been added, the image quality may be low. This process can be performed using a known technique, and thus a description thereof is omitted here. Then, in S602, the compression level is changed based on the result obtained in S601.

If it is determined that the input resolution compression block is a block whose image quality causes no problem even when the block is compressed at a high compression level, in S603, the input 128×128 pixel resolution compression block is demagnified to ¼ in the vertical and horizontal directions as defined in FIG. 3. If the input resolution compression block is determined to be compressed at a medium compression level, the block is demagnified to ½ in the same manner as in S604. If it is determined that the image quality is not to be lowered, in S605, the resolution compression block is not subjected to a demagnification process. In this manner, by making such a determination for each unit block of the input image data, the data can be compressed while minimizing the lowering of image quality.

Block Management Table Registration Process

Figure 7:
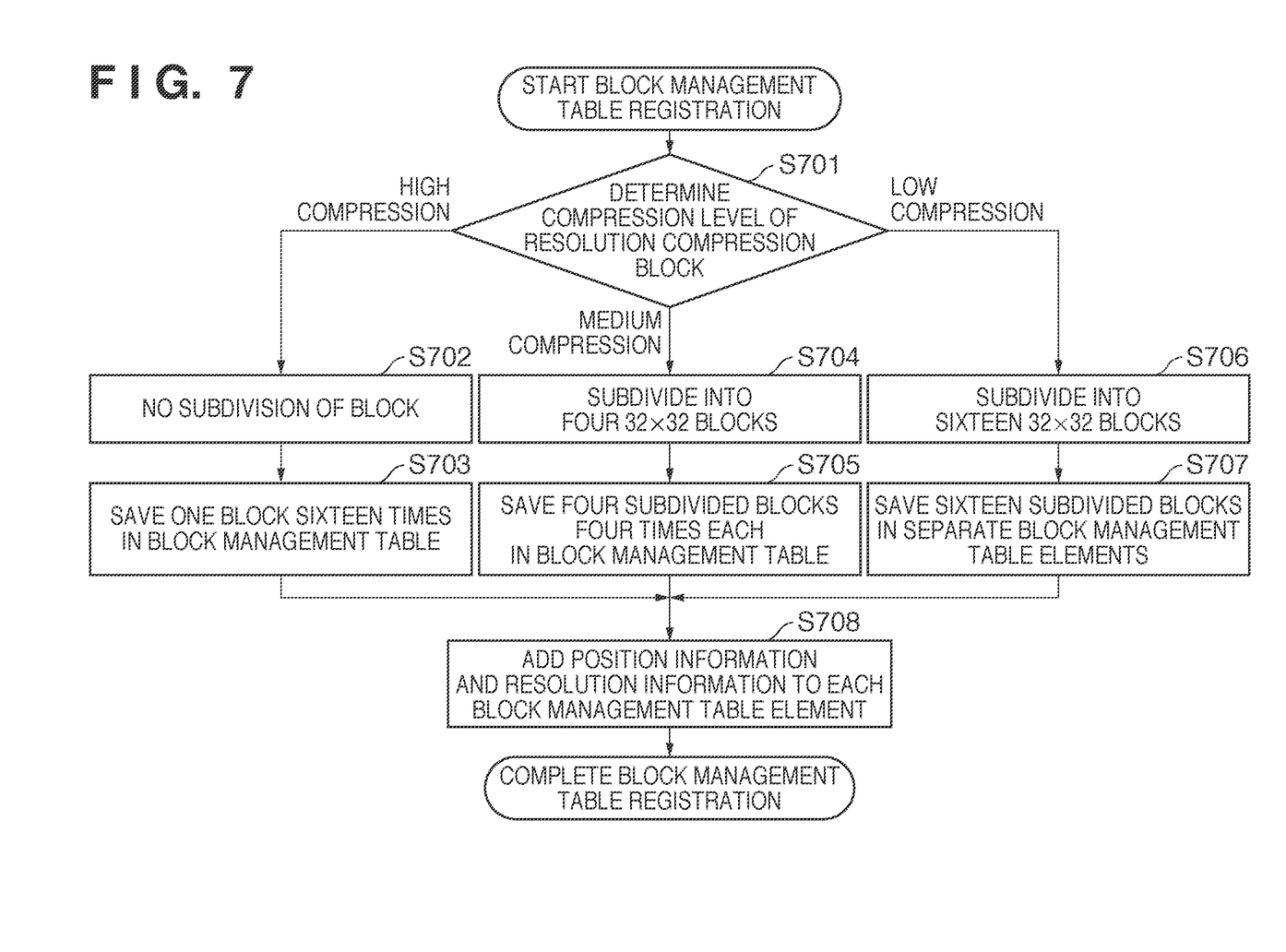
FIG. 7 shows a flowchart showing an operation of block management table registration according to the embodiment of the present invention.
Figure 9A:
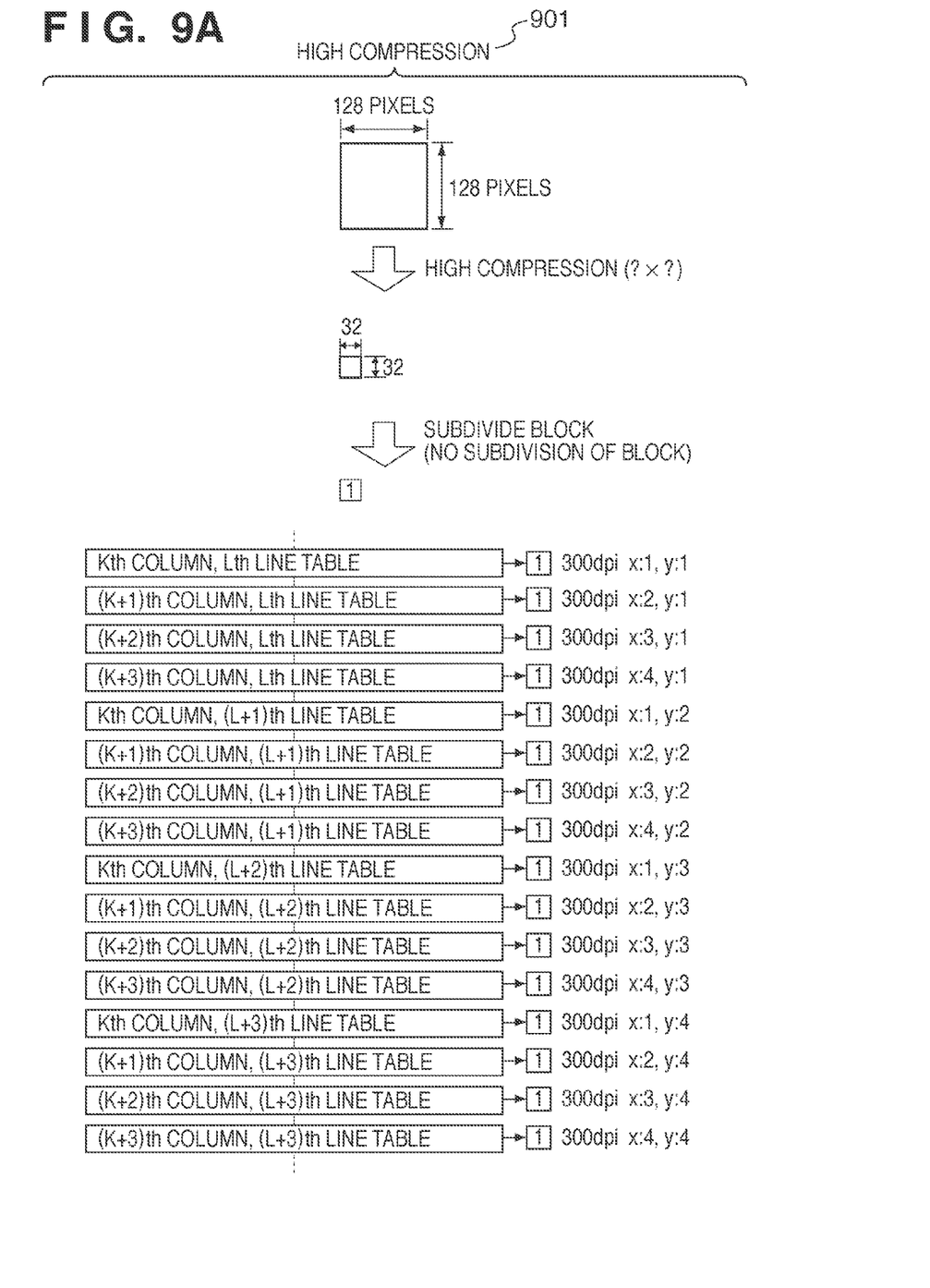
FIGS. 9A to 9C are diagrams illustrating resolution compression operations for different compression rates according to the embodiment of the present invention
Figure 9B:
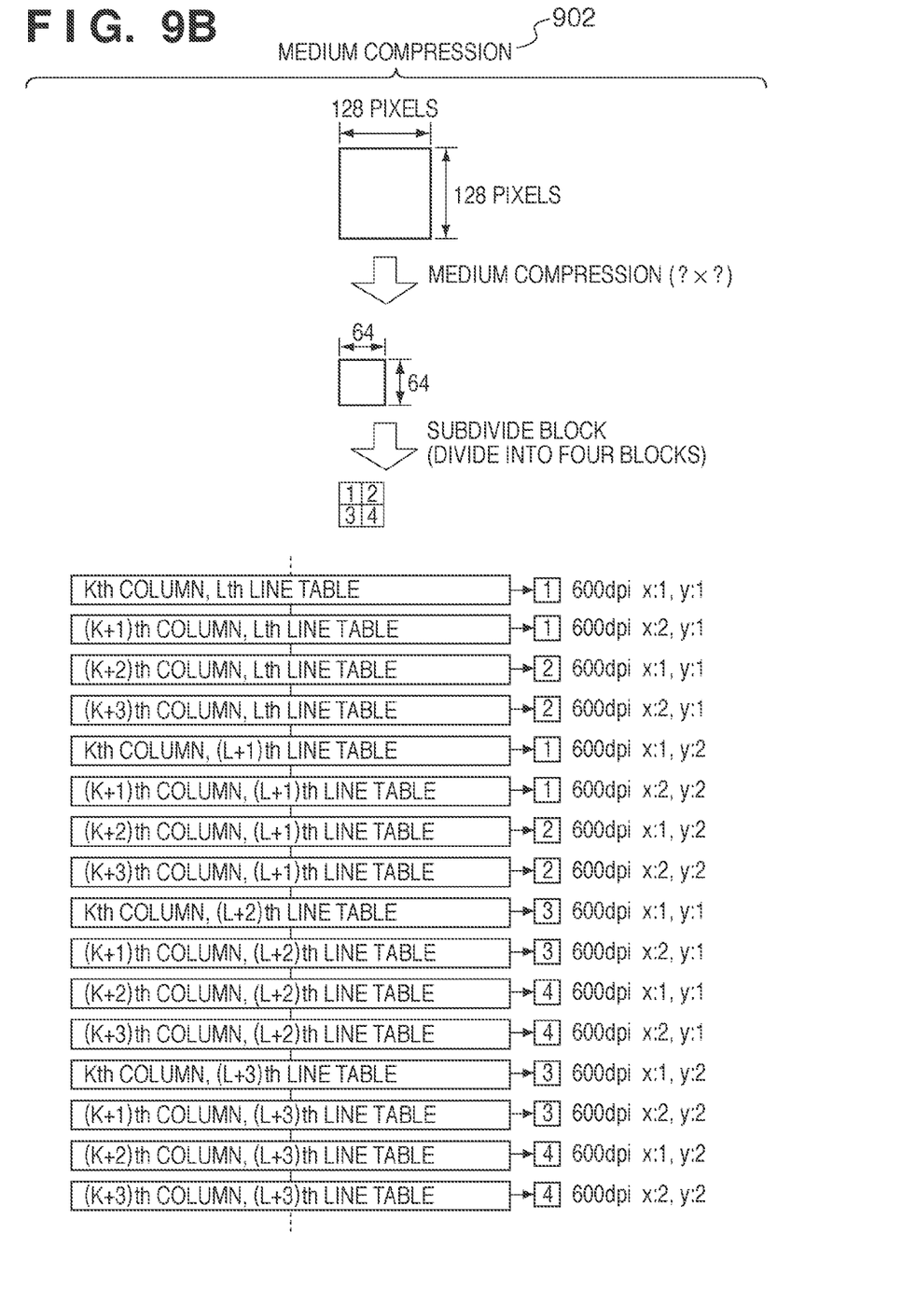
Figure 9C:
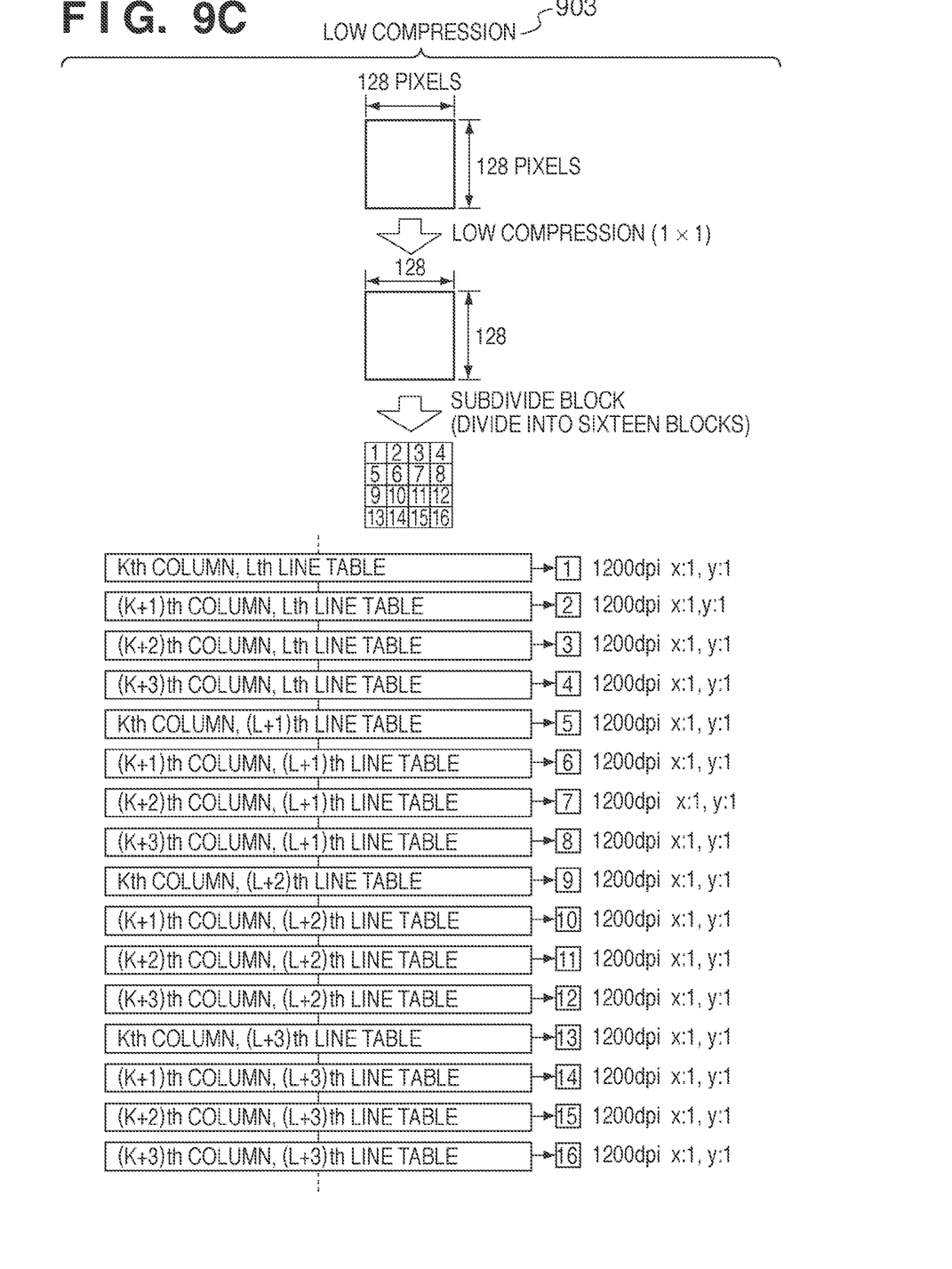

FIG. 7 is a diagram showing a flowchart for registering image data that has undergone resolution compression in a block management table. First, in S701, the compression level (high, medium and low) of the image of the resolution compression unit block subjected to resolution compression in S601 is determined. If the resolution compression block has been compressed at a high compression level and demagnified to ¼ in the vertical and horizontal directions, the procedure advances to S702, and the block is held with the same size without dividing into blocks. Then, in S703, an address for linking to this demagnified 32×32 pixel image block is saved in each of sixteen corresponding table elements of a block management table as shown in FIGS. 9A to 9C, which will be described later. After that, the procedure advances to S708. In the case of an image compressed at a medium compression level in S601, the image has been demagnified to ½ in the vertical and horizontal directions by resolution compression. That is, because the image is demagnified to a 64×64 pixel block, the procedure advances from S701 to S704, where the 64×64 pixel block is divided into basic compression blocks, specifically, four 32×32 pixel blocks. After that, an address for linking four corresponding table elements of a block management table to each of the divided basic compression unit blocks is saved. As a result of this processing on each of the divided basic unit blocks, a block management table for the image compressed at a medium compression level as shown in FIG. 9B, which will be described later, is obtained. Then, the procedure advances to S708. In the case of an image compressed at a low compression level in S601, the image is not demagnified by resolution compression and thus has a 128×128 pixel block. In S706, this image is divided into basic compression blocks, specifically, sixteen 32×32 pixel blocks. Then, in S707, an address for linking to each of the sixteen divided basic compression unit blocks is saved in sixteen table elements of a block management table. After that, the procedure advances to S708. Finally, in S708, position information and resolution information of each block are added to the corresponding table elements in which image data addresses are registered. Through the above procedure, block management table registration is performed.

Block Management Table

Figure 8:
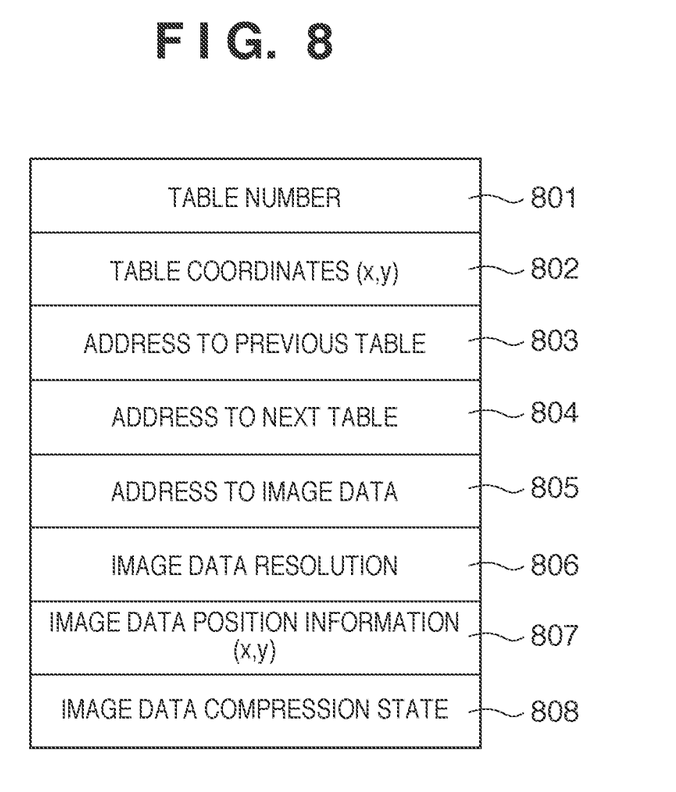
FIG. 8 is a diagram showing an example of a configuration of block management table elements according to the embodiment of the present invention.

FIG. 8 shows an example of an information header of each table element of the block management table. Table number 801 is a number that indicates the order of the table element in the block management table. Table coordinates 802 is position information that indicates the position of the image in the block management table. Address to previous table 803 and address to next table 804 are information held for access from each block management table element to the previous or next table element. Address to image data 805 is address information that indicates actual image data of basic compression block-sized image data managed by the table element. Image data resolution 806 indicates the resolution to which the image data registered in this table element is compressed.

Image data position information 807 is a parameter that indicates which portion of the registered image data is necessary because, as will be described later, in the case of image data having a low resolution, an image that is larger than the basic compression block is registered. Finally, image data compression state 808 is information that indicates whether or not image data registered in this table element has undergone encoding compression. Image data is managed on a block-by-block basis by using the block management table elements described above. It should be noted that the configuration of the block management table shown here is merely an example, and other constituent elements may be included.

Compression Operation

FIG. 9A to 9C are diagrams showing a series of processing from the resolution compression process to the block management table registration for each compression level. First, a case where the resolution compression block is a block that needs to be compressed at a high compression level will be described as 901 in FIG. 9A. In the case of the block to be compressed at a high compression level, in S603, the 128×128 pixel resolution compression block is compressed to a 32×32 pixel block. Next, when this block is registered in a block management table, in S702, the block is not subdivided because the block compressed to ¼ size has the same size (32×32 pixels) as a basic compression block. In the block management table, because table elements are provided for basic compression unit blocks, an address that indicates the same image is registered in each table element. This corresponds to address to image data 805 mentioned in connection to FIG. 8. At this time, information that indicates the level to which the registered image has been resolution-compressed is also registered in each table element. This corresponds to image data resolution 806 of FIG. 8. Furthermore, position information that indicates which portion of the registered image data corresponds to that table element is also added. This corresponds to image data position information 807 of FIG. 8. Thus, when the image data is decompressed into a raster image, the image data can be restored by referring to the resolution data and position data of the information header.

A description will be given taking a table element whose image data resolution 806 is 300 dpi and whose image data position information 807 is x:1, y:2 as a specific example. First, because the image has been compressed to ¼ size, the registered image data is magnified by four times from 300 dpi to 1200 dpi. In this case, each table element manages a basic compression block (32×32 pixels) image, but when magnified by four times, a 128×128 pixel image is obtained. Next, image data position information 807 is referred to, and which portion of the magnified 128×128 pixel image data needs to be cut out and acquired is determined. For example, the case of x:1, y:2 indicates that this table element holds a 32×32 pixel block (basic compression unit block) located in the first line and the second column in the magnified 128×128 pixel image. Image data compressed to ¼ size is registered in each table element, and resolution information and position information are added to each table element such that the above-described state can be held.

The same applies to blocks to be compressed at a medium compression level. A case where the resolution compression block is compressed at a medium compression level will be described as 902 in FIG. 9B. In S604, the 128×128 pixel resolution compression block is compressed to a 64×64 pixel block. Next, when this block is registered in a block management table, first, in S703, the block that has undergone resolution compression is subdivided. In the case of a block to be compressed at a medium compression level, because there are data regarding four basic compression blocks (four 32×32 pixel blocks), the block is subdivided into four like a "cross-in-square" shape shown in 902 in FIG. 9B. Each of the subdivided images is registered in a respective table element. In this case as well, as in the case of the block to be compressed at a high compression level, resolution information and position information are added. When restoring the image data, because the image data has been compressed to ½ size, the registered data is magnified by two times from 600 dpi to 1200 dpi. The process after this is the same as that of the block to be compressed at a high compression level.

A case where the resolution compression block is compressed at a low compression level will be described as 903 in FIG. 9C. In S605, the 128×128 pixel resolution compression block is not compressed. In this case, when this block is registered in a block management table, first, in S706, the block that has not undergone resolution compression is subdivided. In this example, the block is divided into sixteen basic compression blocks (sixteen 32×32 pixel blocks). Each of the subdivided images is registered in a respective table element. In this case as well, as in the case of the block to be compressed at a high compression level, resolution information and position information are added. When restoring the image data, because the image data has not been compressed, the data is used without being magnified. In the case of the block to be compressed at a low compression level, image data position information 807 of the block management table is always x:1, y:1. In this manner, it is possible to manage an image in which different resolution levels are mixed. Decompressing (decoding) the compressed data will be described briefly. When restoring the compressed image to the original data, decoding can be executed by performing the above process in reverse. Specifically, the registered basic compression block is magnified based on the compression level held in the resolution data. For example, in the case of the block to be compressed at a high compression level, the block is magnified by sixteen times. Image data is selected from among the magnified table elements based on the information held in the position data. By repeating this process, all image data can be decompressed.

Encoding Compression Process

Figure 10:
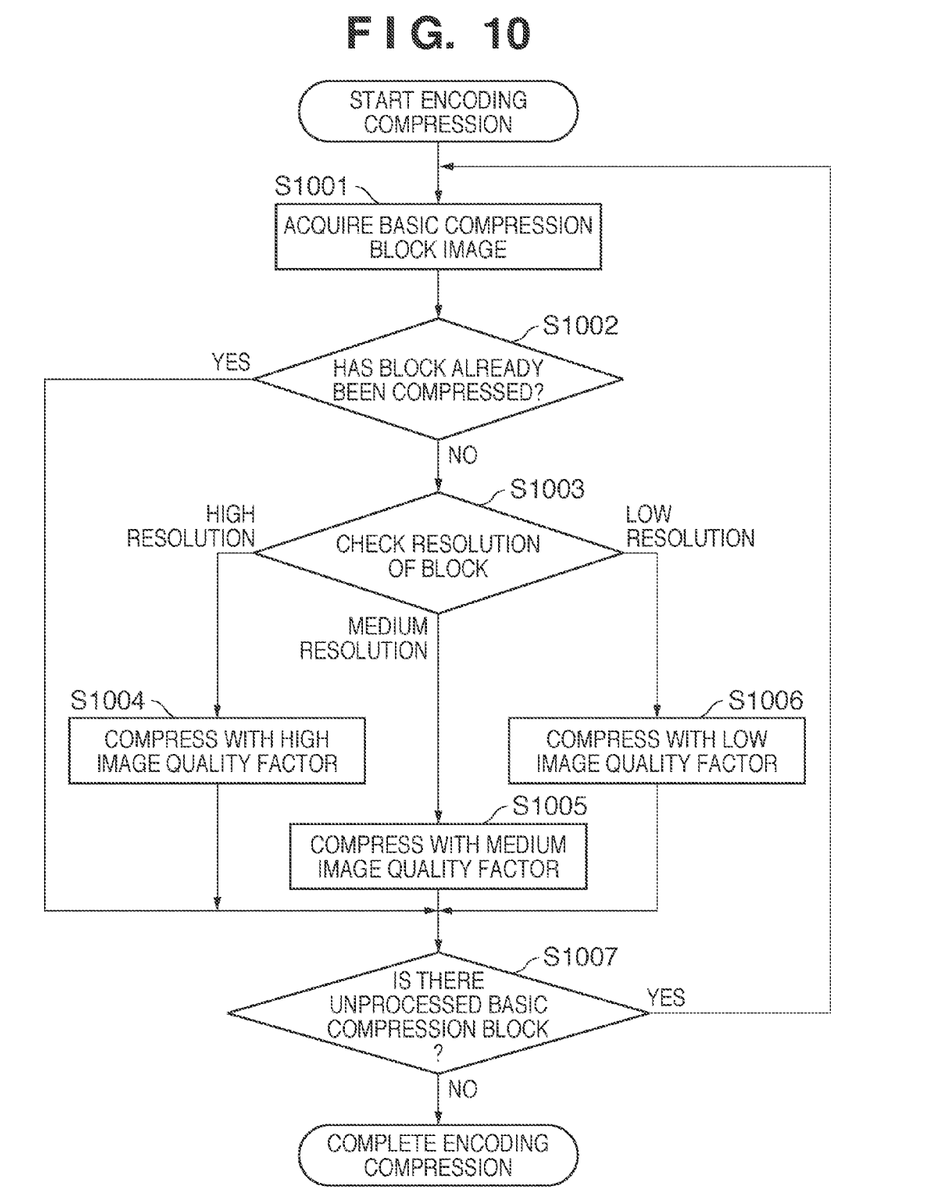
FIG. 10 shows a flowchart showing an operation of an encoding compression process according to the embodiment of the present invention.

FIG. 10 is a flowchart showing a procedure of encoding compression, which corresponds to S409 of FIG. 4. First, in S1001, image data of a basic compression block is acquired from the table elements. Next, in S1002, whether an encoding process has already been applied to the acquired basic compression block and the acquired basic compression block is encoding compressed is checked. In other words, there is a possibility that the resolution compression and the block management table registration described in connection to FIGS. 6 and 7 have been applied to the image data, and as a result, the same image data is registered a plurality of times in the table elements in the case of high compression (S702) and medium compression (S704). Accordingly, a check is performed so that this process is skipped for a block image to which an encoding compression process has been applied once. Accordingly, if the block has already been subjected to encoding compression (Yes in S1002), the encoding process is omitted, and the procedure advances to S1007. If the block has not been subjected to encoding compression (No in S1002), the procedure advances to S1003, where the compression state of the image block registered in the table element is checked. If the compression state is a high compression state as a result of the check, the procedure advances to S1004, where an encoding process (e.g., JPEG) is performed using a high compression factor (a first quantization scale). If the compression state is a medium compression state, the procedure advances to S1005, where an encoding process is performed using a medium compression factor (a second quantization scale that is larger than the first quantization scale). Similarly, if the compression state is a low compression state, the procedure advances to S1006, where an encoding process is performed using a low compression factor (a third quantization scale that is larger than the second quantization scale). At this time, when the encoding process is applied in S1004, S1005 and S1006, information indicating that compression has already been applied is added to image data compression state 808 of the information header shown in FIG. 8. At this time, information indicating that compression has already been applied may be added uniformly to basic compression blocks registered in duplicate. In this manner, the encode amount can be more efficiently reduced. When the encoding process in S1004, S1005 and S1006 is complete, the procedure advances to S1007. In S1007, whether or not all the basic compression blocks have been processed is determined. If all the basic compression blocks have not been processed (Yes in S1007), the procedure returns to S1001, where processing is repeated on an unprocessed basic compression block. If all the basic compression blocks have been processed (No in S1007), the flowchart ends. The compression method performed in S1004, S1005 and S1006 can be any encoding compression method, and therefore a detailed description thereof is omitted here. Accordingly, values such as image factors described above depend on the encoding compression method applied.

With the embodiment described above, it is possible to perform an encoding compression process on raw image data of mixed resolution. In addition, for high resolution images, by partially reducing the resolution without lowering of the image quality, the amount of data can be reduced and held. It is also possible to perform processing such as a color converting process on the image that has undergone resolution compression, and therefore the burden on the image data path can be reduced. Furthermore, because the image that has undergone resolution compression can be subjected to encoding compression, the amount of data is further reduced and therefore the data can be saved in an internal memory, and the built-in memory of the apparatus can be reduced.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-216170, filed on Sep. 17, 2009, which is hereby incorporated by reference herein in its entirety.

What is claimed is:

1. An image processing apparatus comprising:
    a resolution compression unit that performs resolution compression by thinning out pixels of a unit block image that has a second size that is larger than a first size;
    a registration unit that registers the block image generated by the resolution compression unit in a block management table; and
    an encoding compression unit that performs an encoding compression process on each block image registered by the registration unit;
    wherein the resolution compression unit determines a compression level for unit block images having the second size and compresses each unit block image having the second size with a compression rate according to the determined compression level, and
    the registration unit divides the block image compressed according to the determined compression level into block images having the first size and registers the divided block images in the block management table in units of the second size.

2. The image processing apparatus according to claim 1, wherein the encoding compression unit determines whether or not encoding compression has been applied to each of the block images having the first size registered in the block management table by the registration unit, and performs encoding compression on a block image if it is determined that encoding compression has not been applied to the block image.

3. The image processing apparatus according to claim 2, wherein the block management table includes an image of each of the blocks having the first size, position information and resolution information in the block having the second size for each of the blocks having the first size, and compression state information based on which the encoding compression unit determines whether or not encoding compression has been applied.

4. A method for controlling an image processing apparatus comprising the steps of:

performing resolution compression by thinning out pixels of a unit block image that has a second size that is larger than a first size;

registering the block image generated in the resolution compression step in a block management table, which is performed by a registration unit of the image processing apparatus; and performing an encoding compression process on each block image registered in the registration step, which is performed by an encoding compression unit of the image processing apparatus;

wherein the resolution compression step comprises determining a compression level for unit block images having the second size and compressing each unit block image having the second size with a compression rate according to the determined compression level, and the registration step comprises dividing the block image compressed according to the determined compression level into block images having the first size and registering the divided block images in the block management table in units of the second size.

5. A non-transitory computer-readable storage medium storing a program that causes a computer to function as:

a resolution compression unit that performs resolution compression by thinning out pixels of a unit block image that has a second size that is larger than a first size;

a registration unit that registers the block image generated by the resolution compression unit in a block management table; and an encoding compression unit that performs an encoding compression process on each block image registered by the registration unit;

wherein the resolution compression unit determines a compression level for unit block images having the second size and compresses each unit block image having the second size with a compression rate according to the determined compression level, and the registration unit divides the block image compressed according to the determined compression level into block images having the first size and registers the divided block images in the block management table in units of the second size.

* * * * *